Figure 1:
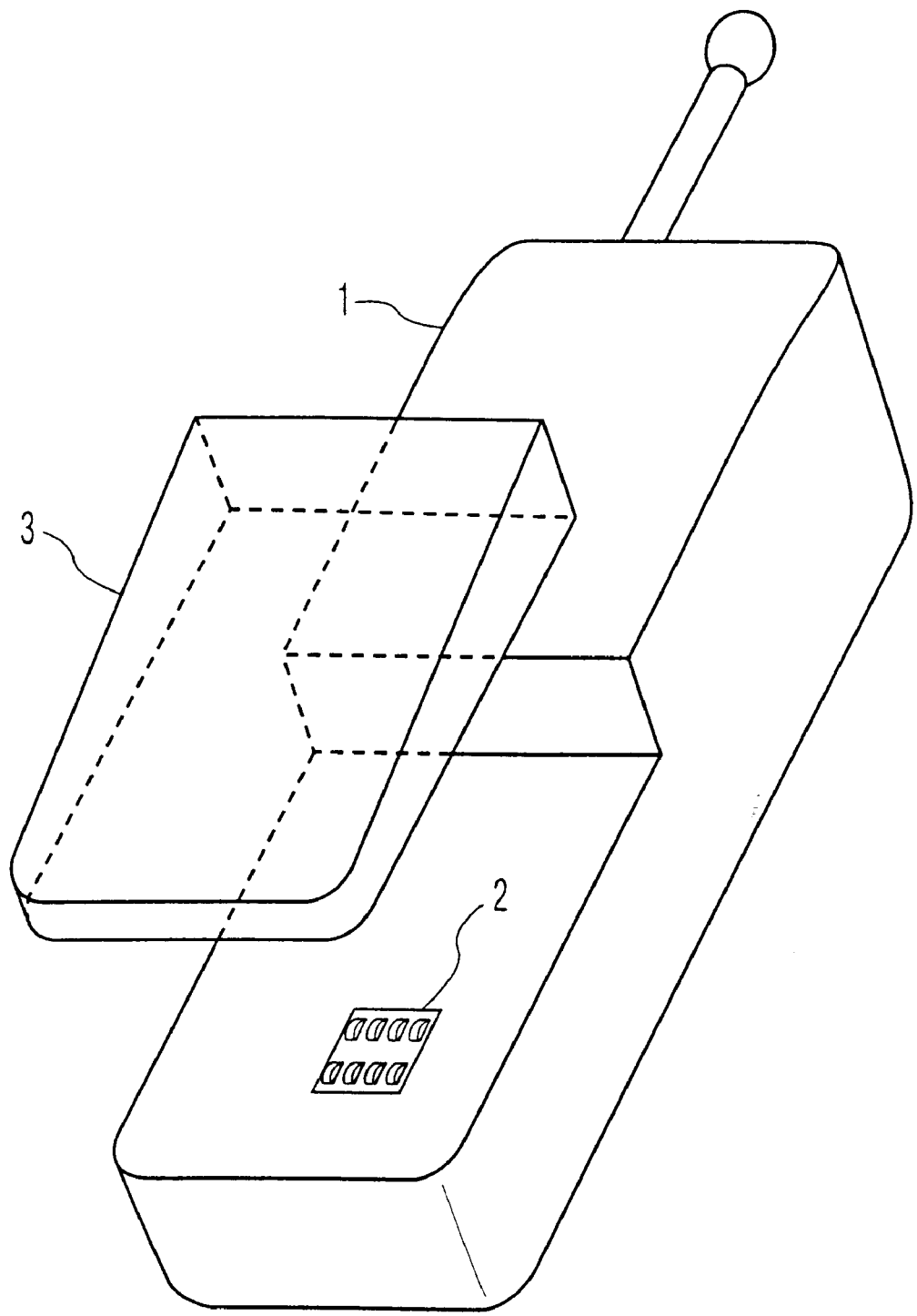

United States Patent [19]
Jubert

[11] Patent Number: 5,907,814
[45] Date of Patent: May 25, 1999

[54] APPARATUS WHICH INCLUDES AN ADAPTER FOR READING CHIP CARDS OF DIFFERENT FORMATS

[75] Inventor: Laurent Jubert, Change, France

[73] Assignee: U.S. Philips Corporation, New York, N.Y.

[21] Appl. No.: 08/778,229

[22] Filed: Jan. 8, 1997

[30] Foreign Application Priority Data

Jan. 10, 1996 [FR] France ................................. 96 00217

[51] Int. Cl.⁶ ........................................................ H04B 1/00
[52] U.S. Cl. ............................ 455/550; 455/558; 455/90; 455/575; 455/349
[58] Field of Search .............................. 455/90, 348, 558, 455/575, 550, 351, 349, 347, 557, 66, 344; 379/357, 428, 429, 433; 439/260; 257/679

[56] References Cited

U.S. PATENT DOCUMENTS

| | | | |
|---|---|---|---|
| 4,975,086 | 12/1990 | Reichardt et al. | 439/629 |
| 5,257,414 | 10/1993 | Trahan et al. | 455/90 |
| 5,336,877 | 8/1994 | Raab et al. | 235/475 |
| 5,353,328 | 10/1994 | Jokimies | 455/558 |
| 5,418,837 | 5/1995 | Johansson et al. | 455/558 |
| 5,436,969 | 7/1995 | Kobayashi | 379/428 |
| 5,604,787 | 2/1997 | Kotzin et al. | 455/558 |
| 5,615,250 | 3/1997 | Kobayashi | 455/90 |
| 5,615,260 | 3/1997 | Kurgan | 379/433 |
| 5,657,373 | 8/1997 | Hermanson et al. | 455/558 |
| 5,669,069 | 9/1997 | Rautila | 455/90 |
| 5,699,406 | 12/1997 | Liikanen et al. | 455/90 |

FOREIGN PATENT DOCUMENTS

| | | | |
|---|---|---|---|
| 0 453 737 | 3/1991 | European Pat. Off. | G01R 1/073 |
| 0 494 503 | 11/1991 | European Pat. Off. | G06K 7/06 |
| 0 522 762 | 6/1992 | European Pat. Off. | H04M 1/72 |
| 0 556 970 | 2/1993 | European Pat. Off. | H04B 1/38 |
| 0 702 460 | 3/1996 | European Pat. Off. | H04B 1/38 |
| 40 29 576 | 9/1990 | Germany | H01R 33/74 |
| H8-87582 | 4/1996 | Japan | G06K 19/077 |

*Primary Examiner*—Reinhard J. Eisenzopf
*Assistant Examiner*—Makoto Aoki
*Attorney, Agent, or Firm*—Dicran Halajian

[57] ABSTRACT

An apparatus, such as a portable telephone, is disclosed. The telephone includes a chip card reader having a connector and a adapter which has a full-SIM side and a micro-SIM side. The micro-SIM side has a rail and a stop. Further, the adapter is reversibly and removably located in a recess of the telephone. The full-SIM side of the adapter is visible when a full-SIM chip card is connected to the connector of the chip card reader, and the adapter's micro-SIM side is visible when a micro-SIM chip card is connected to the connector. The rail and said stop are arranged to place contact pads of an integrated circuit present on the micro-SIM chip card opposite the connector of the chip card reader.

9 Claims, 2 Drawing Sheets

5,907,814

APPARATUS WHICH INCLUDES AN ADAPTER FOR READING CHIP CARDS OF DIFFERENT FORMATS

The present invention relates to an apparatus, for example, a portable telephone, which includes a chip card reader that has a connector which can be brought into contact with the contact pads of an integrated circuit present on a chip card of a first format called full-SIM format, which apparatus further includes an adapter that makes it possible to insert and read a chip card of a second format called micro-SIM format.

Such an apparatus it known from European Patent no. 0 556 970 A1. This apparatus comprises an adapter which is placed in a recess so as not to form an obstacle for the insertion of the card when the adapter is arranged in the read mode for a chip card of the full-SIM format, that is to say, the standard format for a chip card, and, when arranged in the read mode for a chip card of the micro-SIM format, that is to say, a card whose surface is reduced to the surface necessary for providing an integrated circuit thereon, tilts by a pivot link and places the contact pads of said integrated circuit against the connector of the chip card reader. The pivotal mounting used presents one drawback: while the adapter is tilted, it protrudes from the body of the apparatus and then becomes vulnerable to shock. A transverse shock may indeed break certain parts that form the pivotal mounting, thus irreparably separating the adapter from the apparatus.

It is an object of the present invention to remedy this drawback by proposing an adapter which is integrated, without protrusion, with the body of the apparatus.

Indeed, according to the present invention, an apparatus of the type defined in the opening paragraph is characterized in that the adapter is formed by a removable and reversible part that has two sides, the first side called full-SIM side being practically smooth, the second side, called micro-SIM side presenting a groove and a stop, and in that the apparatus has a recess for receiving the adapter, which recess has a configuration so that when the adapter is put in the read mode for a chip card of the full-SIM format, only its full-SIM side is visible and placed opposite the connector of the chip card reader, and when the adapter is put in the read mode for a chip card of the micro-SIM format, only its micro-SIM side is visible, the recess used for holding the adapter and the groove and the stop of the latter being arranged so that the contact pads of the integrated circuit present on the micro-SIM card are placed opposite the connector of the chip card reader after said card has been inserted.

A particular embodiment of the invention provides in apparatus as described above, characterized in that the body of the adapter has the form of a small rule and in that the recess holding said adapter has the associated female shape while the assembly forms a sliding connection.

A variant of the invention provides an apparatus as described above, which has a removable casing for being fixed in an operating position facing the chip card reader, characterized in that the recess for holding the adapter is provided on the removable casing.

Such a removable casing may contain, for example, a battery for the power supply of the apparatus.

These and other aspects of the invention are apparent from and will be elucidated with reference to the embodiments described hereinafter.

Figure 2:
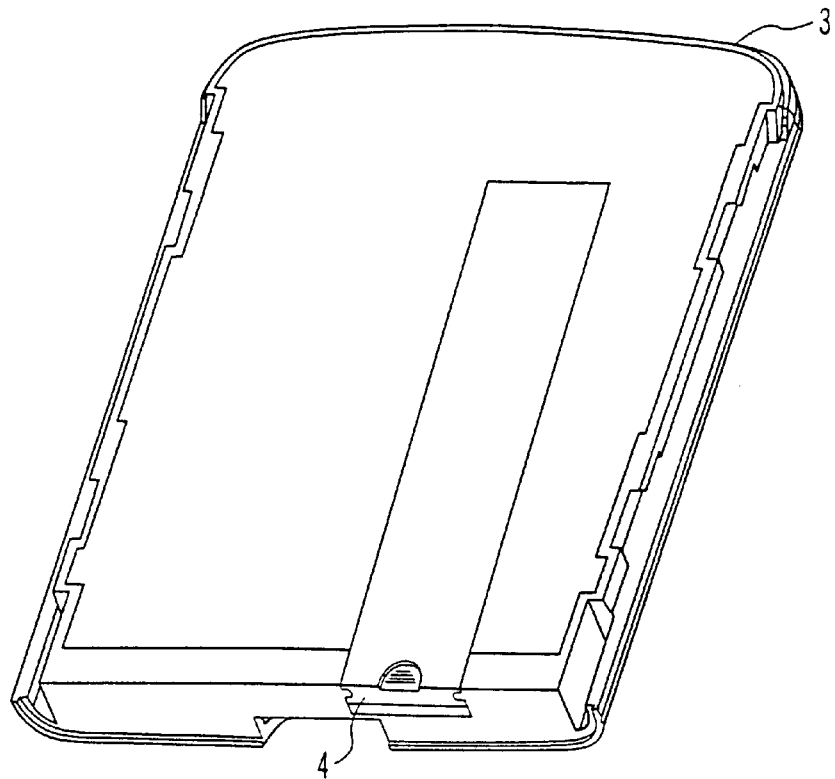
Figure 3:
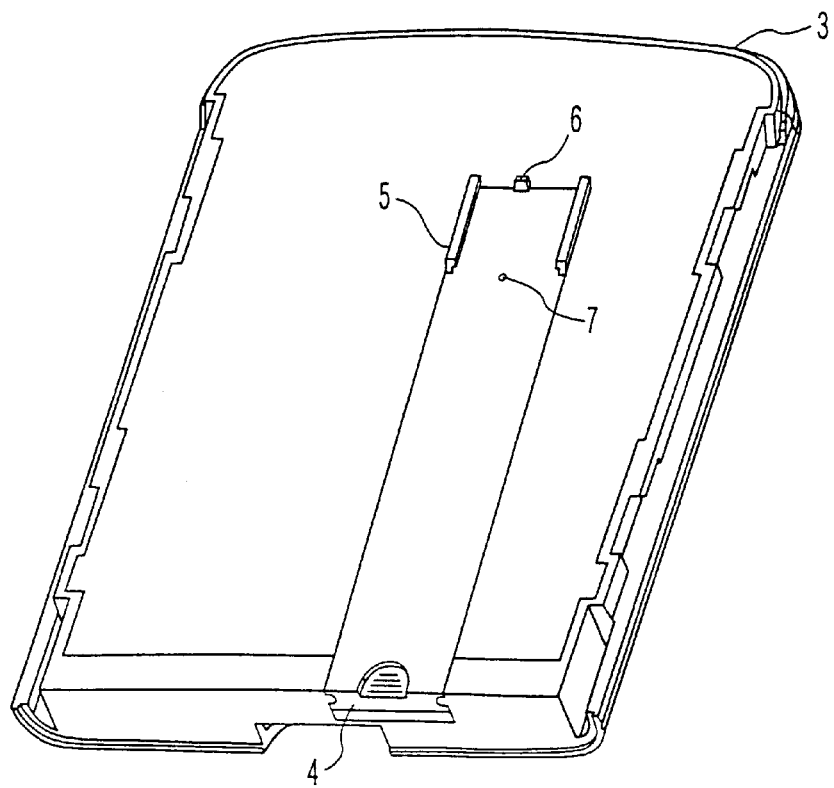

In the drawings:

FIG. 1 is a diagrammatic representation of an apparatus which implements the invention, FIG. 2 is a diagrammatic representation of a removable casing according to a variant of the invention, and FIG. 3 is a diagrammatic representation of a removable casing according to a variant of the invention.

FIG. 1 diagrammatically shows an apparatus 1, for example, a portable telephone, which includes a chip card reader that has a connector 2 which can be brought into contact with the contact pads of an integrated circuit present on a chip card of a first format called full-SIM format. The apparatus 1 further includes a removable casing 3 which contains, for example, a battery used for the power supply of said apparatus 1. In operation, this removable casing 3 is fixed opposite the chip card reader.

FIG. 2 diagrammatically shows said removable casing 3 in which is provided a recess for holding an adapter 4. The adapter 4 is arranged in the read mode for a chip card of the full-SIM format. Only its full-SIM side, intended for being placed opposite the connector of the chip card reader is visible. Thus, the part of the adapter 4 used for positioning the chip cards of the micro-SIM format is sunk into the body of the removable casing 3, so as not to form an obstacle for the insertion of the full-SIM format chip card.

FIG. 3 diagrammatically shows the same removable casing 3 on which the adapter 4 is arranged in the read mode for a micro-SIM format chip card. The micro-SIM side of the adapter 4, which has a slide 5 and a stop 6 is then visible, the recess for holding the adapter 4 as well as the slide 5 and the stop 6 of the latter being arranged so that the contact pads of the integrated circuit which is present on the micro-SIM card are placed opposite the connector of the chip card reader 2 after said card has been inserted. The micro-SIM side also has a pin 7 which permits of keeping the micro-SIM card pressed against the rails of the slide 5 after its insertion.

I claim:

1. An apparatus comprising a chip card reader havig a connector which can be brought into contact with contact pads of an integrated circuit present on a full-SIM chip card, an adapter which introduces and reads a micro-SIM chip card, wherein the adapter is formed by a removable and reversible part that has a full-SIM side being practically smooth and a micro-SIM side, presenting a groove and a stop, the apparatus having a recess for receiving the adapter, wherein said recess has a configuration so that when the adapter is put in a full-SIM read mode, said full-SIM side is visible and placed opposite the connector of the chip card reader, and when the adapter is put in a micro-SIM read mode, said micro-SIM side is visible, the recess being used for holding the adapter, and the groove and the stop being arranged so that integrated circuit contacts present on the micro-SIM chip card are placed opposite the connector of the chip card reader in said micro-SIM mode.

2. An apparatus as claimed in claims 1, further comprising a removable casing for being fixed in an operating position facing the chip card reader, wherein the recess for holding the adapter is provided on the removable casing.

3. An apparatus as claimed in claim 1, wherein said adapter and said recess form a sliding connection.

4. An apparatus comprising:

a chip card reader having a connector;

a adapter having a full-SIM side and a micro-SIM side, wherein said micro-SIM side has a rail and a stop;

said adapter being reversibly and removably located in a recess of said apparatus, wherein said full-SIM side is visible when a full-SIM chip card is connected to said connector of the chip card reader, and wherein said micro-SIM side is visible when a micro-SIM chip card is connected to said connector, said rail and said stop being arranged to place contact pads of an integrated circuit present on the micro-SIM chip card opposite the connector of the chip card reader.

5. An apparatus as claimed in claim 4, wherein said adapter slides into said recess.

6. An apparatus as claimed in claims 4, further comprising a removable casing for being fixed in an operating position facing the chip card reader, wherein the recess for holding the adapter is provided on the removable casing.

7. A portable telephone comprising:

a chip card reader having a connector;

a adapter having a full-SIM side and a micro-SIM side, wherein said micro-SIM side has a rail and a stop;

said adapter being reversibly and removably located in a recess of said portable telephone, wherein said full-SIM side is visible when a full-SIM chip card is connected to said connector of the chip card reader, and wherein said micro-SIM side is visible when a micro-SIM chip card is connected to said connector, said rail and said stop positioning contact pads of the micro-SIM chip card opposite the connector of the chip card reader.

8. A portable telephone as claimed in claim 7, wherein said adapter slides into said recess.

9. A portable telephone as claimed in claims 7, further comprising a removable casing for being fixed in an operating position facing the chip card reader, wherein the recess for holding the adapter is provided on the removable casing.

* * * * *